US012643044B2

(12) United States Patent
Ekkati et al.

(10) Patent No.: US 12,643,044 B2
(45) Date of Patent: Jun. 2, 2026

(54) MERGING LOCAL MAPS FROM MAPPING DEVICES

(71) Applicant: Niantic Spatial, Inc., San Francisco, CA (US)

(72) Inventors: Anvith Ekkati, Mountain View, CA (US); Purna Sowmya Munukutla, Santa Clara, CA (US); Dharini Krishna, Santa Clara, CA (US); Peter James Turner, Redwood City, CA (US); Gandeevan Raghuraman, Santa Clara, CA (US); Si ying Diana Hu, Mountain View, CA (US)

(73) Assignee: Niantic Spatial, Inc., San Francisco, CA (US)

( * ) Notice: Subject to any disclaimer, the term of this patent is extended or adjusted under 35 U.S.C. 154(b) by 0 days.

(21) Appl. No.: 18/620,402

(22) Filed: Mar. 28, 2024

(65) Prior Publication Data

US 2024/0238675 A1      Jul. 18, 2024

Related U.S. Application Data

(63) Continuation of application No. 17/127,199, filed on Dec. 18, 2020, now Pat. No. 11,969,651.
(Continued)

(51) Int. Cl.
A63F 13/5378        (2014.01)
A63F 13/213         (2014.01)
(Continued)

(52) U.S. Cl.
CPC ........ *A63F 13/5378* (2014.09); *A63F 13/213* (2014.09); *A63F 13/216* (2014.09);
(Continued)

(58) Field of Classification Search
CPC .... A63F 13/5378; A63F 13/216; A63F 13/65; A63F 2300/8082; G06T 15/00; G06T 19/006
See application file for complete search history.

(56) References Cited

U.S. PATENT DOCUMENTS 9,581,431 B1 * 2/2017 Sieracki ............... G01B 11/005
9,984,499 B1   5/2018 Jurgenson et al.
(Continued)

FOREIGN PATENT DOCUMENTS

CN      106595659 A      4/2017
CN      107004028 A      8/2017
(Continued)

OTHER PUBLICATIONS

Bonanni, T.M., et al. "3-d map merging on pose graphs," IEEE Robotics and Automation Letters, Jan. 18, 2017, vol. 2, Issue 2, pp. 1031-1038.
(Continued)

*Primary Examiner* — Carl V Larsen
(74) *Attorney, Agent, or Firm* — Fenwick & West LLP

(57) ABSTRACT

An augmented reality system generates computer-mediated reality on a client device. The client device has sensors including a camera configured to capture image data of an environment. The augmented reality system generates a first 3D map of the environment around the client device based on captured image data. The server receives image data captured from a second client device in the environment and generates a second 3D map of the environment. The server links the first and second 3D together in a singular 3D map. The singular 3D map may be a graphical representation of the real world using nodes that represent 3D maps generated by image data captured at client devices and edges that represent transformations between the nodes.

20 Claims, 7 Drawing Sheets

Related U.S. Application Data

(60) Provisional application No. 62/952,036, filed on Dec. 20, 2019.

(51) Int. Cl.

| | |
|---|---|
| *A63F 13/216* | (2014.01) |
| *A63F 13/65* | (2014.01) |
| *G06T 15/00* | (2011.01) |
| *G06T 19/00* | (2011.01) |

(52) U.S. Cl.
CPC .............. *A63F 13/65* (2014.09); *G06T 15/00* (2013.01); *G06T 19/006* (2013.01); *A63F 2300/8082* (2013.01)

(56) References Cited

U.S. PATENT DOCUMENTS

| | | | | |
|---|---|---|---|---|
| 10,282,574 | B1 * | 5/2019 | Tyagi | G01S 5/021 |
| 10,290,049 | B1 * | 5/2019 | Xu | G06T 19/20 |
| 10,547,974 | B1 * | 1/2020 | Pollefeys | H04W 4/023 |
| 10,748,302 | B1 * | 8/2020 | Dine | G06T 19/00 |
| 10,867,408 | B1 * | 12/2020 | Sethi | G06T 7/74 |
| 10,990,829 | B2 * | 4/2021 | Cameron | G06T 7/579 |
| 11,087,479 | B1 | 8/2021 | Geraghty et al. | |
| 11,321,929 | B2 * | 5/2022 | Huo | H04L 67/12 |
| 11,348,320 | B2 * | 5/2022 | Peri | G06T 7/593 |
| 11,969,651 | B2 * | 4/2024 | Ekkati | G06T 19/006 |
| 2012/0249544 | A1 | 10/2012 | Maciocci et al. | |
| 2012/0306850 | A1 | 12/2012 | Balan et al. | |
| 2014/0267234 | A1 * | 9/2014 | Hook | G06T 19/006 |
| | | | | 345/419 |
| 2014/0323148 | A1 | 10/2014 | Schmalstieg et al. | |
| 2015/0199852 | A1 | 7/2015 | Chang et al. | |
| 2015/0237481 | A1 * | 8/2015 | Ben-Moshe | H04W 4/027 |
| | | | | 455/456.1 |
| 2016/0088287 | A1 | 3/2016 | Sadi et al. | |
| 2016/0179830 | A1 * | 6/2016 | Schmalstieg | G06F 16/2264 |
| | | | | 707/722 |
| 2017/0287191 | A1 | 10/2017 | Zawada et al. | |
| 2017/0345167 | A1 * | 11/2017 | Ard | G06T 19/006 |
| 2019/0012840 | A1 * | 1/2019 | Finman | G06T 17/05 |
| 2019/0156577 | A1 * | 5/2019 | Barros | G06V 20/20 |
| 2019/0156579 | A1 * | 5/2019 | Sheftel | H04N 7/185 |
| 2019/0311214 | A1 * | 10/2019 | Lakemond | G06F 18/22 |
| 2019/0332115 | A1 | 10/2019 | Lim et al. | |
| 2020/0050208 | A1 * | 2/2020 | Frick | G05D 1/227 |
| 2020/0175760 | A1 | 6/2020 | Guo et al. | |
| 2020/0372673 | A1 | 11/2020 | Iyer et al. | |
| 2021/0360368 | A1 * | 11/2021 | Li | H04W 4/33 |

FOREIGN PATENT DOCUMENTS

| | | | |
|---|---|---|---|
| CN | 108369743 | A | 8/2018 |
| CN | 108682027 | A | 10/2018 |
| CN | 109426333 | A | 3/2019 |
| CN | 110199313 | A | 9/2019 |
| CN | 110322511 | A | 10/2019 |
| JP | 07-271434 | A | 10/1995 |
| JP | 2018-084699 | A | 5/2018 |
| TW | 201528227 | A | 7/2015 |
| WO | WO 2019/010466 | A1 | 1/2019 |
| WO | WO 2019/230169 | A1 | 7/2021 |

OTHER PUBLICATIONS

Bosse, M., et al., "Simultaneous Localization and Map Building in Large-Scale Cyclic Environments Using the Atlas Framework," The International Journal of Robotics Research, vol. 23, No. 12, Dec. 2004, pp. 1113-1139.

Eade, E., et al., "Monocular SLAM as a Graph of Coalesced Observations," 2007 IEEE 11th International Conference on Computer Vision, Rio de Janeiro, Brazil, Oct. 14-21, 2007, pp. 1-8.

Egodagamage, R., et al., "A Collaborative Augmented Reality Framework Based on Distributed Visual Slam," 2017 International Conference on Cyberworlds, Sep. 20, 2017, pp. 25-32.

European Patent Office, Extended European Search Report and Opinion, European Patent Application No. 20901073.5, Dec. 15, 2022, 15 pages.

Japan Patent Office, Office Action, Japanese Patent Application No. 2022-538069, Oct. 31, 2023, four pages.

Kim, B., et al., "Multiple Relative Pose Graphs for Robust Cooperative Mapping," IEEE International Conference on Robotics and Automation (ICRA), May 2010, pp. 3185-3192.

PCT International Search Report and Written Opinion, PCT Application No. PCT/IB2020/062241, Mar. 29, 2021, nine pages.

Strasdat, H. et al., "Double window optimization for constant time visual SLAM," In 2011 IEEE International Conference on Computer Vision, Nov. 6, 2011, pp. 2352-2359.

Taiwan Intellectual Property Administration, Office Action, TW Patent Application No. 109145173, Dec. 2, 2021, 17 pages.

Taiwan Intellectual Property Office, Office Action, TW Patent Application No. 111127787, Sep. 4, 2023, 13 pages.

United States Office Action, U.S. Appl. No. 17/127,199, filed Nov. 29, 2022, 12 pages.

United States Office Action, U.S. Appl. No. 17/127,199, filed Sep. 7, 2023, 13 pages.

China National Intellectual Property Administration, Office Action, CN Application No. 202080097057.1 , Mar. 28, 2025, 17 pages.

Japanese Patent Office, Office Action, JP Patent Application No. 2024-059577, Mar. 4, 2025, 10 pages.

* cited by examiner

MERGING LOCAL MAPS FROM MAPPING DEVICES

CROSS REFERENCE TO RELATED APPLICATIONS

This application is a continuation of U.S. patent application Ser. No. 17/127,199, filed Dec. 18, 2020, which claims the benefit of U.S. Provisional Application No. 62/952,036, filed Dec. 20, 2019, each of which is incorporated by reference in its entirety.

FIELD OF THE DISCLOSURE

The present disclosure relates generally to computer-mediated reality systems, and more particularly, to an augmented reality (AR) system that links 3D maps generated from data gathered by client devices into a singular 3D map.

BACKGROUND

A parallel reality game may provide a shared virtual world that parallels at least a portion of the real world can host a variety of interactions that can attract a community of players. Providing a virtual world with a geography that parallels at least a portion of the real world allows players to navigate the virtual world by navigating the real world. During play, a player may view the virtual world throughout a handheld or wearable device, which uses computer-mediated reality technologies to add, subtract, or otherwise alter the player's visual or audible perception of their environment.

However, accurately altering the player's visual perception of the environment typically involves accurately knowing the player's location in the real world. This may be difficult to ascertain since traditional positioning devices are not accurate enough to determine a player's location without a sizable range of error. Thus, a system for mapping the real world as captured by cameras of players' mobile devices to aid in determining the location of mobile devices in future is desirable.

SUMMARY

In location-based parallel reality games, players navigate a virtual world by moving through the real world with a location-aware client device, such as a smartphone. Many client devices use image data captured by on-device camera(s) to map players' environments, which may be to determine players' locations, determine augmented reality (AR) images to overlay on the captured image data, and the like. These maps may describe the same environment, but due to being captured on different client devices, the map may have a different coordinate space and capture a different view of the environment. To create a singular 3D map of an environment, the generated maps may be linked together based on image data, location data, and/or the client devices that captured such data.

According to a particular embodiment, a system connected to a plurality of client devices by a network receives a first set of image data captured by a camera integrated at a first client device. The first set of image data represents a near real-time view of a first area around the first client device. The system generates a first 3D map based on the first set of image data. The 3D map spatially describes the first area around the first client device. The system receives a second set of image data representing a near real-time view of a second area around a second client device and generates a second 3D map based on the second set of image data. The system analyzes the first and second 3D maps to identify a common feature and links the first and second 3D maps into a singular 3D map based on the common feature.

The singular 3D map may be a graph of nodes, each representing a 3D map generated by image data captured at a client device. Each node may be associated with a different coordinate space based on the client device that captured the image data, and the graph may include edges between the nodes that represent a transformation between the coordinate spaces. The system may use the graph to determine a location of a client device in the environment.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Figure 1:
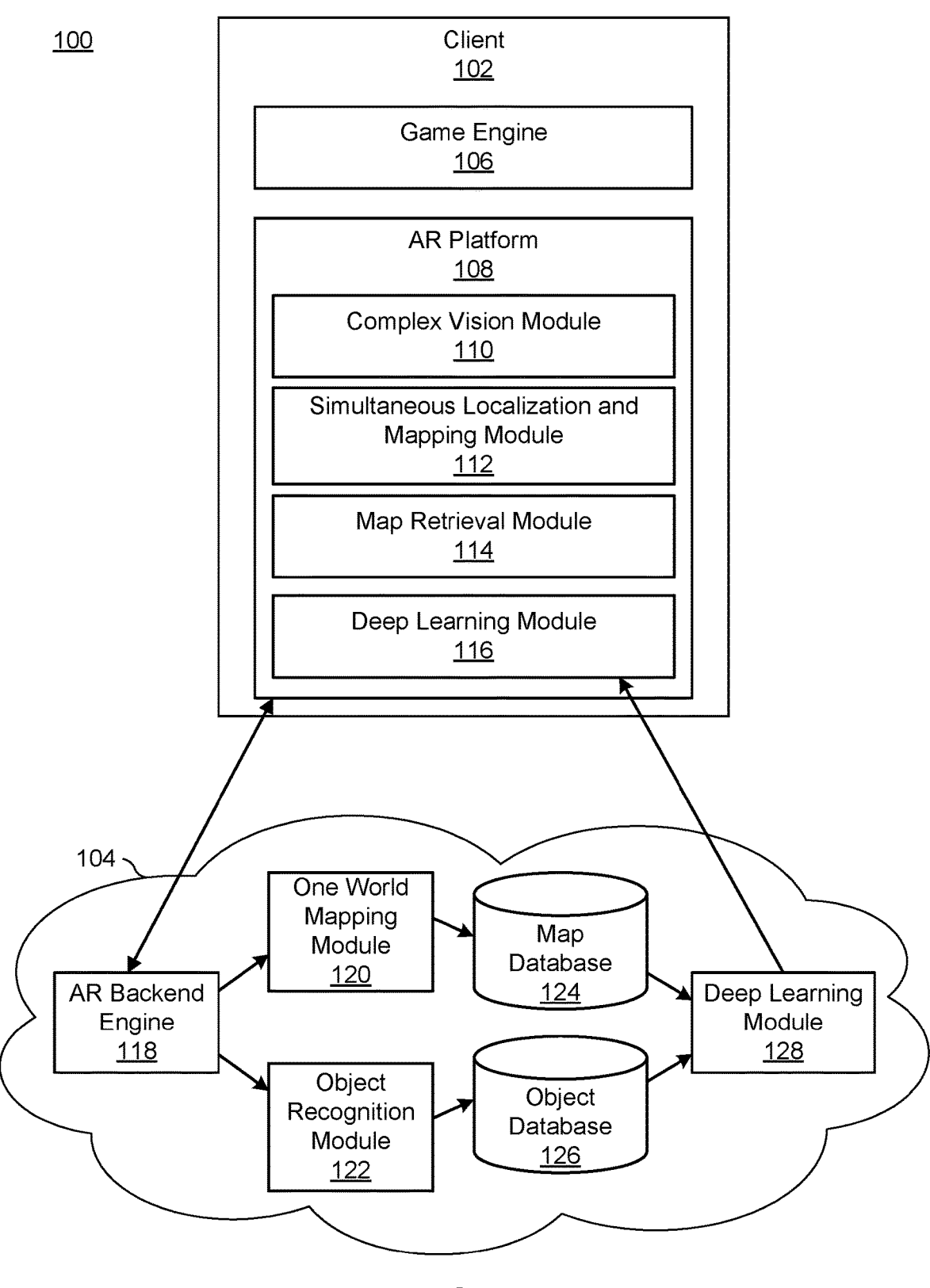
FIG. 1 shows a networked computing environment for generating and displaying augmented reality data, according to an embodiment.

A system and method links together two or more local maps into a singular map. The singular map may be used to enable augmented reality interactions in a virtual world that parallels the real world. In various embodiments, the local maps are stitched together based on containing common features, synchronization data indicating relative locations of the client devices that generated the local maps, or both.

In one embodiment, the system uses images and global positioning system (GPS) coordinates on a client device (e.g., on a handheld or worn electronic device) to generate a 3D map. The 3D map is built from camera recording modules and an inertial measurement unit (IMU), such as accelerometer or gyroscope. The images and GPS coordinates are sent to the server. The server and client device process data together to establish the objects and geometry, as well as to determine potential interactions. Examples of potential interactions include those that are made in a room with AR animations, such as moving a virtual element.

Through use of the images and the 3D map together, the system may accomplish object detection and geometry estimation using neural networks or other types of models. An example of a neural network is a computational model used in machine learning which uses a large collection of connected simple units (artificial neurons). The units connect together in software, and if the combined input signal is large enough, the units fire their own output signal. The system may use deep learning (e.g., a multi-layer neural network) to contextually understand AR data. Other types of models may include other statistical models or other machine learning models.

The system aggregates local maps to create a one or more global maps (e.g., by linking local maps together). The aggregated maps are combined together into a singular global map on the server, which provides a digital map of the environment, or "world." For example, two local maps generated by one or more devices may be represented as nodes in different coordinate spaces. For any combination of similar GPS coordinates, similar images, and similar sensor data that include portions of the local maps that match within a predetermined threshold may be determined to contain common features (e.g., "overlap" in space). Thus, the system can link the two nodes together with an edge that represents a transformation between the coordinate spaces of the nodes. The linked nodes may be contained in a graph of nodes representing other local maps made using images captured by client devices. The graph may represent the singular global map and may aid in maintaining consistency between the virtual world represented to multiple client devices.

Further, in some embodiments, the system may stitch the local maps together into a world map based on the edge or a common feature contained within the local maps. The world map may store animations for the virtual world at specific GPS coordinates and further be indexed through 3D points and visual images down to the specific place in the world (e.g., with a resolution on the order of one foot/thirty centimeters). In another example, system may stitch together local maps based on synchronization data indicating relative positions of the client devices that generated the local maps as they traversed an environment.

Illustrative processes map data to and from the cloud. In one embodiment, a map is a collection of 3D points in space, such as a point cloud, that represents the world in a manner analogous to 3D pixels. Image data is sent along with the 3D maps when available and useful. Certain examples send 3D map data without image data.

In various embodiments, a client device uses 3D algorithms executed by a processor to generate a 3D map. The client device sends images, the 3D map, GPS data, and any other sensor data (e.g., IMU data, any other location data) in an efficient manner. For instance, images may be selectively sent so as to not to bog down transmission or processing. In one example, images may be selectively sent when they show a novel viewpoint of the environment but not when they merely show a previously seen viewpoint within the environment. An image, for instance, is designated for sending by the system when the field of view of a camera of the client device has minimal overlap with previous images from past or recent camera poses, or when the viewpoint in the image has not been observed for an amount of time dependent on the expected movements of the objects. As another example, images may be provided if more than a threshold amount of time has elapsed since a previous image from the current (or a substantially overlapping) viewpoint was provided. This may enable the stored images associated with the map to be updated to reflect a more current (or at least a recent) status of a real-world location depicted by the images.

In various embodiments, a cloud-side device, such as a server, includes a real time detection system that uses 3D data and images to detect objects and estimate the geometry of the real-world environment depicted in the images. For example, a 3D map of a room that is not photorealistic (e.g., semi-dense and/or dense 3D reconstruction), may be determinable with images. The server fuses together the images and 3D data with the detection system to build a consistent and readily indexed 3D map of the world, or composite real-world map using GPS data. Once stored, the real-world map may be searched to locate previously stored animations and other virtual objects.

In various embodiments, mapping and tracking is done on the client device. The client device gathers a sparse reconstruction of the real world (digitizing the world), along with a location of a camera of the client device relative to the real world. Mapping includes creating a point cloud or collection of 3D points. The client device communicates the sparse representation back to the server by serializing and transmitting point cloud information and GPS data. Cloud processing enables multiplayer capabilities (sharing map data between independent client devices in real or close to real time), having a working physical memory (storing map and animation data for future experiences not stored locally on the device), and object detection.

The server includes a database of maps and frames. Each frame includes sensor data such as one or more of pixels that form images, pose with respect to a coordinate space, camera intrinsics (e.g., camera parameters such as focal length), feature points, and/or feature descriptors, etc. The server uses the GPS data to determine if a real-world map has been previously stored for a real-world location. If located, the server may transmit the stored map to a client device.

AUGMENTED REALITY COMPUTING SYSTEM

FIG. 1 is a block diagram of an AR computing system 100 that includes a client device 102 cooperating with elements accessed via a network 104, according to an embodiment. For example, the elements may be components of a server to produce AR data. The client device 102 is a computing device that a user may use to access a parallel reality game (e.g., augmented reality game) or another augmented reality system, in some embodiments. The client device captures image data (also referred to as images) via an on-device camera, 3D data, GPS data, and the like. The client device 102 includes, for example, a game engine 106 (e.g., the UNITY® game engine or another physics/rendering engine) and an AR platform 108.

The game engine 106 may facilitate a parallel reality game (or other AR program) at the client device 102. For instance, the game engine 106 may receive interactions made by a user with the client device 102, such as the user entering information via an interface of the client device 102 or a user moving the client device within the real world. The game engine 106 may display information for the parallel reality game to the user via the interface based on these interactions. The game engine 106 may locally store information for the parallel reality game, including virtual elements available at virtual locations in the virtual world that correspond to locations within the real world. Alternatively, the game engine 106 may access game board information describing the virtual world at the server and continuously communicate with the server to facilitate the parallel reality game at the client device 102. The parallelism between the virtual world and real world for the parallel reality game is further described in relation to FIG. 4.

The AR platform 108 may execute segmentation and object recognition on data captured by the client device 102. The AR platform includes a complex vision module 110, a simultaneous localization and mapping module 112, a map retrieval module 114, and a deep learning module 116. In some embodiments, the AR platform includes alternative or additional modules.

The complex computer vision module 110 executes client-side image processing. The complex computer vision module 110 receives image data captured by a camera on the client device 102 and perform image processing on the image data. The image processing may include image segmentation and local 3D estimation.

The simultaneous localization and mapping (e.g., SLAM) module 112 maps an environment around the client device 102 based on image data and GPS data captured by the client device 102. In particular, the SLAM module 112 creates one or more local maps each representing portions of the real world as viewed in data captured by the client device 102. The SLAM module 112 may also determine the location of the client device 102 in the environment, in some embodiments. The SLAM module 112 includes a mapping system that creates the local maps, which may include point, line and plane geometries. Further, the SLAM module 112 may build up point clouds and use tracking information captured by the client device 102 to find a location of the camera (e.g. client device 102) in space. In other embodiments, the SLAM module may build maps using image data and tracking information The SLAM module 112 further re-projects animations or augmented values from the virtual world back into the real word by overlaying the animations or augmented values on the image data captured by the client device 102, which is presented via a display of the client device 102. In other embodiments, the SLAM module 112 may use different or additional approaches to mapping the environment around a client device 102 and/or determining the client device's 102 location in that environment.

In some embodiments, the SLAM module 112 may synchronize the location of the client device 102 with another client device before generating a local map of an environment. For instance, the SLAM module may receive image data of a machine-readable code (e.g., QR code) in the environment and synchronize the location of the client device 102 to other client devices that captured an image of the same machine-readable code. The SLAM module 112 may store this information as synchronization data for the local map indicating the location of the environment. In another example, if the image data contains a view of another client device, which the SLAM module 112 may determine from the image data or a user may indicate via the client device 102, the SLAM module 112 may store synchronization data for the local map indicating that the client device 102 was co-located with another client device and reference its local map.

The map retrieval module 114 retrieves maps generated by the SLAM module 112. The map retrieval module 114 retrieves previously generated maps (e.g., via the network 104) from the map database 124, which is described further below. In some embodiments, the map retrieval module 114 may store some maps locally at the client device 102, such as a map for a user's home location. The map retrieval module 114 may retrieve maps based on a notification from the game engine 106 and send the maps to the game engine 106 for use in facilitating the parallel reality game.

The deep learning module 116 applies machine-learned models for object recognition on maps. The deep learning module 116 receives maps from the map retrieval module 114. The deep learning module 116 applies one or more machine-learned models perform interest or feature point detection (e.g., using scale-invariant feature transform (SIFT) or Oriented FAST and rotated BRIEF (ORB)) along with object detection and classification. For example, the deep learning module 116 may apply a machine learning model to the maps to determine objects contained within the maps. The machine-learned models may be classifiers, regression models, and the like. The deep learning module 116 may obtain the machine-learned models after training on an external system (e.g., via the network 104). In some embodiments, the deep learning module 116 may also provide results of object recognition and/or user feedback to enable further model training.

The AR computing system 100 includes elements that the client device 102 may access via the network 104. These elements may be located at a remote server and include an AR backend engine 118 in communication with a one world mapping module 120, an object recognition module 122, a map database 124, an objects database 126, and a deep learning training module 128. In other embodiments, additional or different components may be included. Furthermore, the functionality may be distributed differently than described herein. For example, some or all of the object recognition functionality may be performed at the client device 102 in some embodiments.

The one world mapping module 120 fuses different local maps together to create a composite real-world map (e.g., a singular 3D map of the real world). The singular 3D map may be represented as a graph of nodes linked together by edges. Each node may represent a map generated by a client device 102, which may be the client device 102 shown in FIG. 1 or another client device connected to the server for the parallel reality game. Each map may have its own coordinate space based on the client device 102 that generated the map or variation in the coordinate space of the same device over time (e.g., due to GPS drift or changing conditions, etc.). The edges connecting the nodes may represent a transformation between the coordinate spaces of the nodes. The one world mapping module 120 may add new nodes and edges to the singular 3D map as it receives new maps from client device 102 via the network 104. The one world mapping module 120 stores the singular 3D map in the map database 124.

In an example use case scenario, the one world mapping module 120 may determine an edge between nodes of local maps even when a gap exists between the local maps. For example, the one world mapping module 120 may receive nodes of local maps that each contain portions of a line without a portion that connects the other two portions. The one world mapping module 120 may provisionally extend each portion of the line a specified amount (e.g., ten centimeters, one meter, or to infinity) beyond what is indicated in the local maps. Assuming the relative locations of the local maps are known (e.g., based on feature analysis identifying a common feature or location synchronization, as described previously), the one world mapping module 120 may determine that the portions of the line in each local map are both part of the same line. For example, if the projection of one line causes it to overlap with the other within a threshold amount (e.g., one millimeter, one centimeter, etc.), the one world mapping module 120 may determine that the two portions are part of the same line. Thus, the one world mapping module 120 may determine an edge between the nodes using the missing portion that connects the lines and add the missing portion to one or both of the local maps. The one world mapping module 120 and singular 3D map are further described in relation to FIG. 2.

The map database 124 includes one or more computer-readable media configured to store the map data (i.e., "maps") generated by client devices 102. The map data can include local maps of 3D point clouds stored in association with images and other sensor data collected by client devices 102 at a location. The map data may also include mapping information indicating the geographic relationship between different local maps and a singular 3D map representing the real world or particular environments within the real world. Although the map database 124 is shown as a single entity, it may be distributed across multiple storage media at multiple devices (e.g., as a distributed database).

The object recognition module 122 uses object information from images and 3D data captured by the client device 102 to identify features in the real world that are represented in the data. For example, the object recognition module 122 may determine that a chair is at a 3D location within an environment and add object information describing the chair's 3D location to the object database 126. The object recognition module 122 may perform object recognition on maps stored in the map database, image data captured by one or more client devices 102, or maps generated by one or more client devices 102. The object recognition module may additionally update object information stored in the object database 126 after performing object recognition on new image data of the same environment. The object recognition module 122 may continually receive object information from captured images from various client devices 102 to add to the object database 126.

In some embodiments, the object recognition module 122 may further distinguish detected objects into various categories. In one embodiment, the object recognition module 122 may identify objects in captured images as either stationary or temporary. For example, the object recognition module 122 may determine a tree to be a stationary object. In subsequent instances, the object recognition module 122 may less frequently update the stationary objects compared to objects that might be determined to be temporary. For example, the object recognition module 122 may determine that an animal in a captured image is temporary and may remove the object if in a subsequent image the animal is no longer present in the environment.

The object database 126 includes one or more computer-readable media configured to store object information about recognized objects. For example, the object database 126 might include a list of known objects (e.g., chairs, desks, trees, buildings, etc.) with corresponding locations of the objects and properties of the objects. The properties may be generic to an object type or defined specifically for each instance of the object (e.g., all chairs might be considered furniture but the location of each chair may be defined individually). The object database 126 may further distinguish objects based on the object type of each object. Object types can group all the objects in the object database 126 based on similar characteristics. For example, all objects of a plant object type could be objects that are identified by the object recognition module 122 as plants such as trees, bushes, grass, vines, etc. In some embodiments, the system may learn to distinguish between features that are relatively stable (e.g., stationary) and those that are more dynamic. For example, the system may learn that chairs tend to move around somewhat whereas tables tend to stay in approximately the same location for extended periods of time. Although the object database 126 is shown as a single entity, it may be distributed across multiple storage media at multiple devices (e.g., as a distributed database).

The deep learning module 128 fuses together map data with object information. In particular, the deep learning module 128 may retrieve maps from the map database 124 or one or more client devices 102 and object information from the object database 126. The deep learning module may link the object information with corresponding map data including objects from the object information. The deep learning module 128 may do so using one or more machine learning models trained on the server. The machine learning models may include classifiers, neural networks, regression models, and the like. The deep learning module 128 may store the fused information in the map database 124 or in another database at the server.

Figure 2:
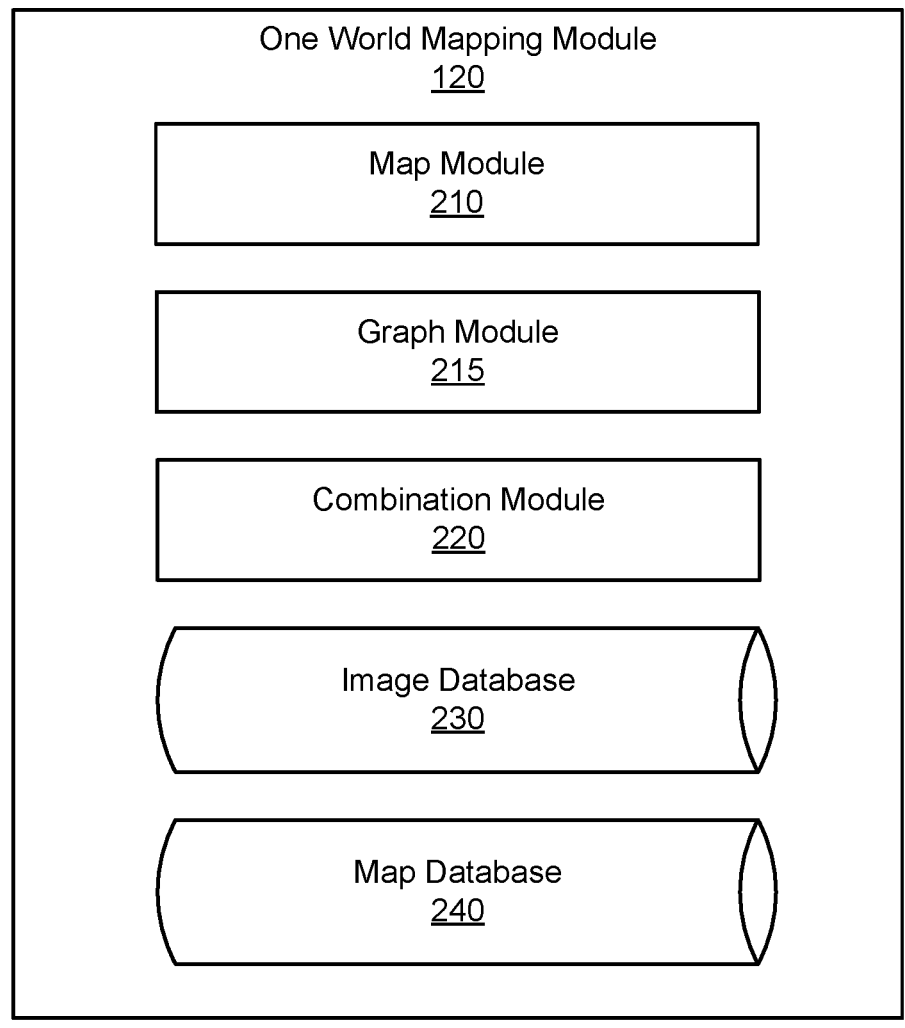
FIG. 2 is a block diagram of the one world mapping module 120, according to one embodiment.

FIG. 2 is a block diagram of the one world mapping module 120, according to one embodiment. The one world mapping module 120 includes a map module 210, a graph module 215, a combination module 220, an image database 230, and a map database 240. In additional or alternative embodiments, the one world mapping module 120 may include other modules that perform additional operations not discussed below. The map module 210 determines maps of an environment based on data captured by the client device 102. Such data may include image data, sensor data, GPS data, and the like.

The map module 210 may build up point clouds based on the captured data, which are used as maps of environments. In some embodiments the map module 210 may use other techniques to determine a map of an environment based on data captured by the client device 102. However, in other embodiments, mapping is performed by the SLAM module 112 rather than the map module 210, and the map module 210 instead retrieves local maps generated at the client device 102 from the SLAM module 112. In some embodiments, one or more of the local maps may have been collaboratively built using data captured by multiple client devices 102 within the same environment. The map module 210 may store local maps at the map database 124. The map module 210 sends local maps to the graph module 215.

The graph module 215 determines graphical representations of one or more local maps. The graph module 215 receives local maps from the map module 210. The graph module 215 may also receive information describing each local map. Such information may include what client device generated the local map and/or captured data used to generated the local map, data used to generate the local map, when the data was captured (e.g., date and time), and the like.

For each local map, the graph module 215 creates a node representing the local map. In some embodiments, each client device 102 and/or server is also represented by a node created by the graph module 215. Each node has its own independent coordinate system based on the information describing the local map, client device, or server that the node represents. Nodes representing local maps of an environment may additionally represent not only spatial coverage of the environment but temporal coverage (e.g., how the environment changes over time). The graph module sends the nodes to the combination module 220 for incorporation into the singular 3D map described previously. In another embodiment, maps for different times (e.g., different periods within a day, such as morning, afternoon, evening, and night, etc.) are stored in different nodes and the edges between them indicate mappings in both spatial and temporal coordinates of the maps.

The combination module 220 converts local maps into a singular 3D map of the real world using feature analysis. In some embodiments, the combination module 220 may combine local maps into one singular 3D map. In other embodiments, the combination module creates a 3D map for each environment using local maps and links the 3D maps in a singular 3D map.

The combination module 220 receives nodes from the graph module 215 representing one or more local maps. For each pair of nodes, combination module 220 may determine an edge. The edge represents a transformation between the coordinate spaces of the nodes. In some cases, a pair of nodes may not have an edge between them (e.g., if the nodes show completely different environments). Otherwise, the pair of nodes may have one or more edges associated with them. In some embodiments, the combination module 220 may only determine edges for nodes in the same environment, which the combination module may determine based on feature matching between the local maps. In one embodiment, the map module 210 may identify two local maps as showing a single environment based on the local maps being within a threshold distance from one another, which the combination module 220 may determine from GPS data used to generate each local map.

The combination module 220 may form edges based on data captured by multiple client devices 102. Each client device may have a confidence score associated with it, and the confidence scores may be used to determine a confidence score of the edge. The confidence score of the edge represents the likelihood that using the transformation the edge represents to move from a first node to a second node will result in an output node identical to the second node. To determine edges, the combination module may use tracking information (e.g., nodes of local maps captured by the same client device during the same session of the parallel reality game are likely to have an edge), feature-based localization (e.g., localizing the two local maps of the nodes based on features contained with the local maps, such as points, lines, etc.), 3D cloud alignment (e.g., with an ICP algorithm), forced overlap between consecutive local maps generated by the same client device 102, post-processing optimization across a plurality of local maps, and/or machine-readable code-based localization (e.g., synchronization).

For example, in one embodiment, the combination module 220 may perform feature analysis to determine an edge for two nodes. The combination module 220 retrieves information from the object database 126 for each of the two local maps and performs feature analysis on each local map to determine if the local maps both contain a common feature using the information. If the combination module 220 determines that each map contains the same common feature, the combination module 220 creates an edge based on the common feature.

In another example, the combination module 220 may determine an edge between nodes based on a synchronization performed by the client device 102. The combination module 220 retrieves synchronization data for each local map indicating that the client device 102 were co-located within the same environment. The synchronization data may be determined when the client devices 102 are pointed at one another or when each client device 102 has captured images of a machine-readable code (e.g., a QR code) or other recognizable feature in the environment. Based on the synchronization data, the combination module 220 determines an edge for the nodes of the local maps.

For each pair of nodes, the combination module 220 accesses a singular 3D map of the real world from the map database 124. The singular 3D map includes a plurality of nodes captured by multiple client devices 102 connected to the server and represents a layout of the real world. If one or both of the nodes is not already in the singular 3D map, the combination module 220 adds the missing node or nodes to the singular 3D map. Furthermore, if the combination module 220 determined an edge for the pair of nodes, the combination module 220 links the edges together in the singular 3D map, essentially linking the local maps into one larger map (e.g., the singular 3D map). In some embodiments, the combination module 220 may additionally stitch together the local maps based on the edge to form a singular map including at least some of both local maps.

The combination module 220 may also add edges between existing nodes in the singular 3D map. In some embodiments, the combination module 220 may combine multiple edges between a pair of nodes into a singular edge when a new edge is determined. In other embodiments, the combination module 220 may keep all edges between a pair of nodes in the singular 3D map and indicate which edge is the newest of all of the edges, such that a client device may use the newest edge to transform between the local maps when necessary.

Client devices 102 connected to the server may use the singular 3D map to localize themselves within an environment and retrieve information about the virtual world at a location for the parallel reality game. Further, the system of nodes and edges may be used to reduce drift and outliers in the singular 3D map. For instance, the combination module 220 may remove nodes that are not linked to other nodes by edges after the node has been in the singular 3D map for a threshold amount of time.

EXAMPLE DATA FLOW

Figure 3:
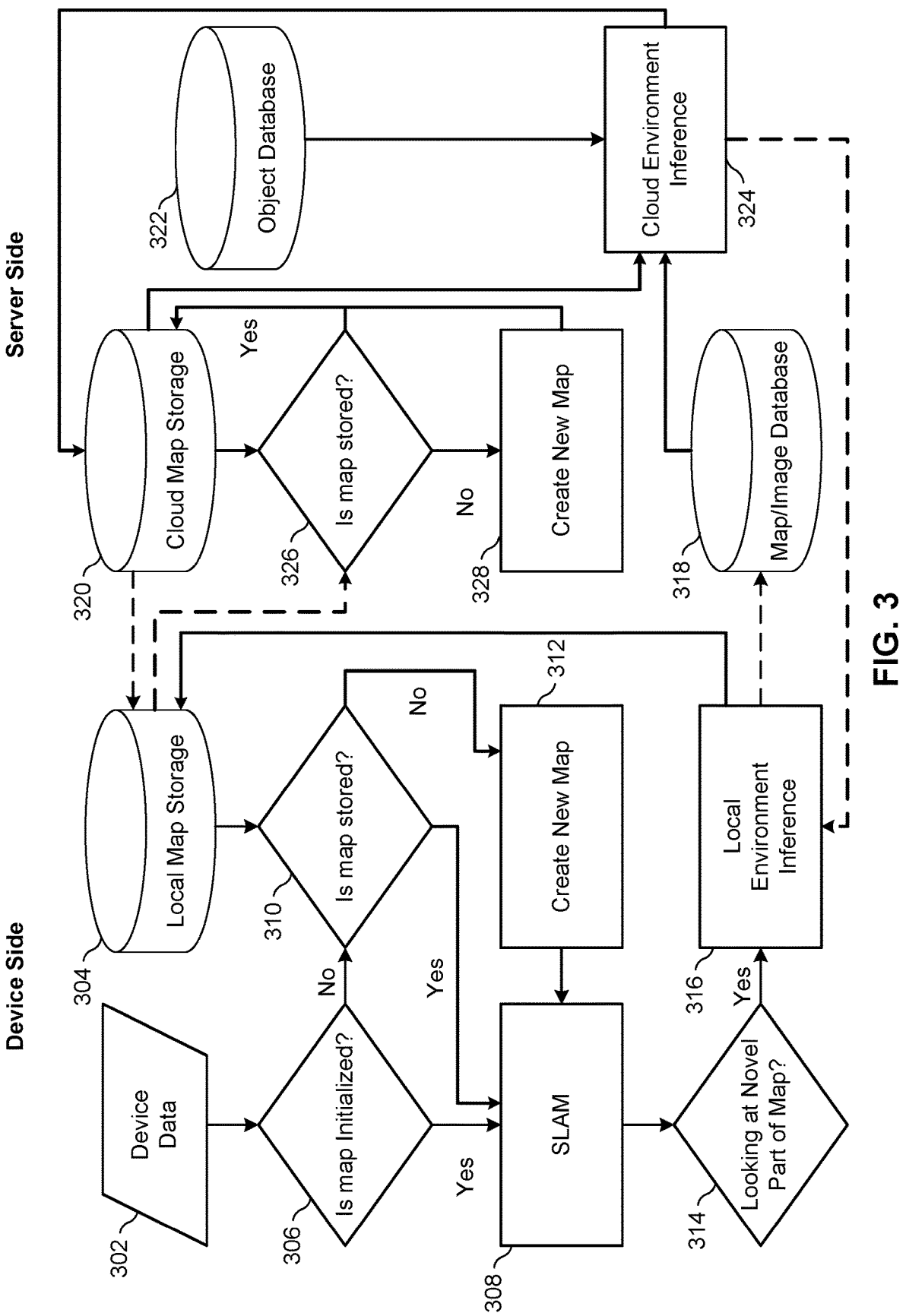
FIG. 3 is a flowchart that illustrates processes that are executable by an AR computing system for generating and displaying augmented reality data, according to an embodiment.

FIG. 3 is a flowchart showing processes executed by a client device 102 and a server to generate and display AR data, according to an embodiment. The client device 102 and the server may be similar to those shown in FIG. 1. Dashed lines represent the communication of data between the client device 102 and server, while solid lines indicate the communication of data within a single device (e.g., within the client device 102 or within the server). In other embodiments, the functionality may be distributed differently between the devices and/or different devices may be used.

At 302, raw data is collected at the client device 102 by one or more sensors. In one embodiment, the raw data includes image data, inertial measurement data, and location data. The image data may be captured by one or more cameras which are linked to the client device 102 either physically or wirelessly. The inertial measurement data may be collected using a gyroscope, an accelerometer, or a combination thereof and may include inertial measurement data up to six degrees of freedom—i.e., three degrees of translation movements and three degrees of rotational movements. The location data may be collected with a global position system (GPS) receiver. Additional raw data may be collected by various other sensors, such as pressure levels, illumination levels, humidity levels, altitude levels, sound levels, audio data, etc. The raw data may be stored in the client device 102 in one or more storage modules which can record raw data historically taken by the various sensors of the client device 102.

The client device 102 may maintain a local map storage at 304. The local map storage includes local point cloud data. The point cloud data comprises positions in space that form a mesh surface that can be built up. The local map storage at 304 may include hierarchal caches of local point cloud data for easy retrieval for use by the client device 102. The local map storage at 304 may additionally include object information fused into the local point cloud data. The object information may specify various objects in the local point cloud data.

Once raw data is collected at 302, the client device 102 checks whether a map is initialized at 306. If a map is initialized at 306, then the client device 102 may initiate at 308 the SLAM functions. The SLAM functions include a mapping system that builds up point cloud and tracking to find the location of the camera in space on the initialized map. The SLAM processes of the example further re-project animation or an augmented value back into the real word. If no map was initialized at 310, the client device 102 may search the local map storage at 304 for a map that has been locally stored. If a map is found in the local map storage at 304, the client device 102 may retrieve that map for use by the SLAM functions. If no map is located at 310, then the client device 102 may use an initialization module to create a new map at 312.

Once a new map is created, the initialization module may store the newly created map in the local map storage at 304. The client device 102 may routinely synchronize map data in the local map storage 304 with the cloud map storage at 320 on the server side. When synchronizing map data, the local map storage 304 on the client device 102 may send the server any newly created maps. The server side at 326 checks the cloud map storage 320 whether the received map from the client device 102 has been previously stored in the cloud map storage 320. If not, then the server side generates a new map at 328 for storage in the cloud map storage 320. The server may alternatively append the new map at 328 to existing maps in the cloud map storage 320.

Back on the client side, the client device 102 determines whether a novel viewpoint is detected at 314. In some embodiments, the client device 102 determines whether each viewpoint in the stream of captured images has less than a threshold overlap with preexisting viewpoints stored on the client device 102 (e.g., the local map storage 304 may store viewpoints taken by the client device 102 or retrieved from the cloud map storage 320). In other embodiments, the client device 102 determines whether a novel viewpoint is detected 314 in a multi-step determination. At a high level, the client device 102 may retrieve any preexisting viewpoints within a local radius of the client device's 102 geolocation. From the preexisting viewpoints, the client device 102 may begin to identify similar objects or features in the viewpoint in question compared to the preexisting viewpoints. For example, the client device 102 identifies a tree in the viewpoint in question and may further reduce from the preexisting viewpoints within the local radius all preexisting viewpoints that also have trees visible. The client device 102 may use additional layers of filtration that are more robust in matching the viewpoint in question to the filtered set of preexisting viewpoints. In one example, the client device 102 uses a machine learning model to determine whether the viewpoint in question matches with another viewpoint in the filtered set (i.e., that the viewpoint in question is not novel because it matches an existing viewpoint). If a novel viewpoint is detected 314, then the client device 102 records at 316 data gathered by the local environment inference. For example, on determining that the client device 102 currently has a novel viewpoint, images captured with the novel viewpoint may be sent to the server (e.g., to a map/image database 318 on the server side). A novel viewpoint detector module may be used to determine when and how to transmit images with 3D data. The local environment inference may include updated key frames for the local mapping system and serialized image and/or map data. The local environment inference may be used by the server to fit the novel viewpoint relative to the other viewpoints at a given location in the map.

On the server side, novel viewpoint data (e.g., comprising point cloud information with mesh data on top) may be stored at 318 in map/image database on the server side. The server may add different parts of a real-world map from stored cloud map storage 320 and an object database 322. The cloud environment inference 324 (comprising the added component data) may be sent back to the client device. The added data may include points and meshes and object data having semantic labels (e.g., a wall or a bed) to be stored at local map storage 304.

CONCEPTUAL DIAGRAM OF VIRTUAL WORLD

Figure 4:
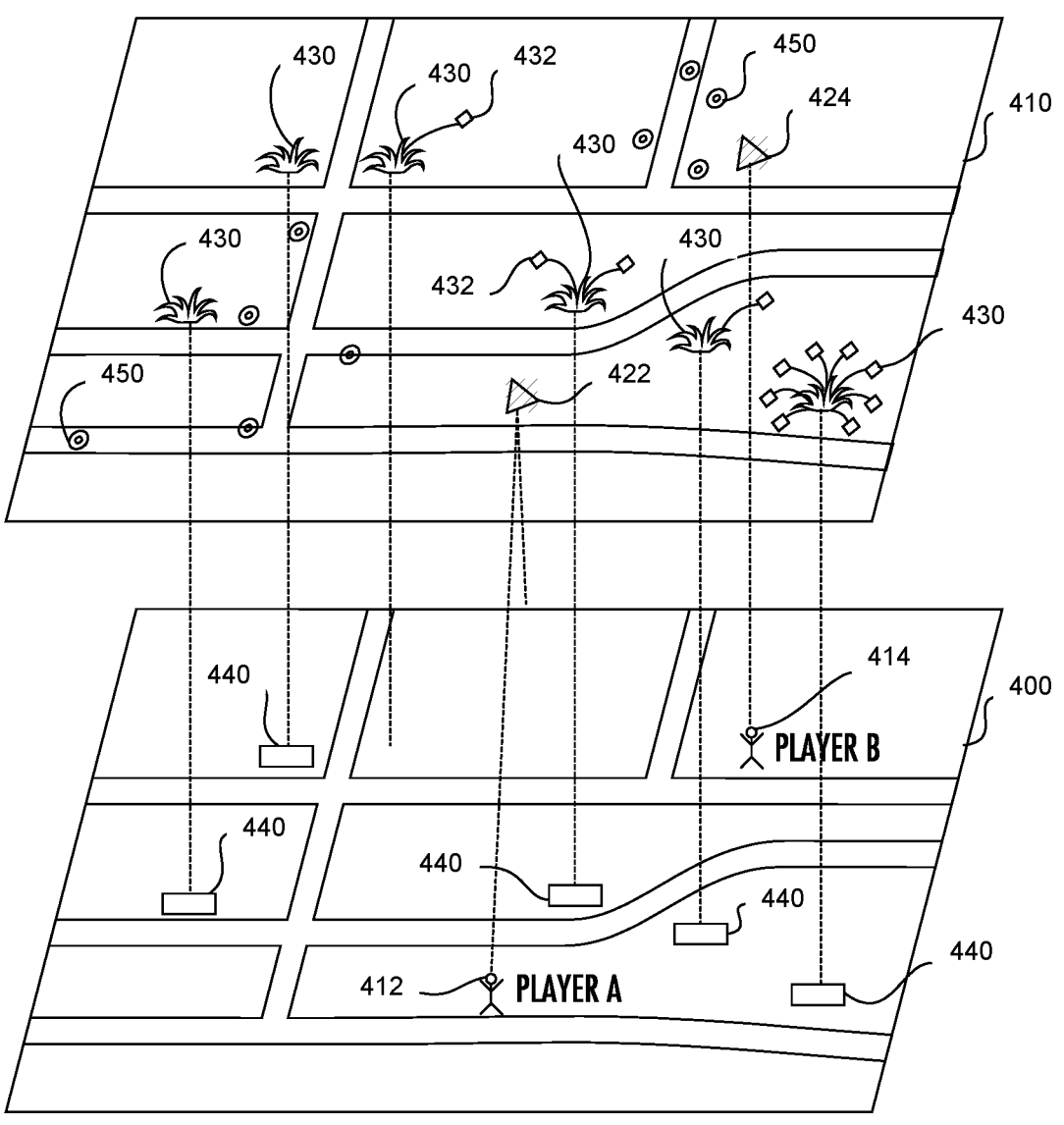
FIG. 4 depicts a conceptual diagram of a virtual world that parallels the real world that can act as the game board for players of a location-based parallel reality game, according to one embodiment.

FIG. 4 depicts a conceptual diagram of a virtual world 410 that parallels the real world 400 that can act as the game board for players of a location-based parallel reality game, according to one embodiment. The client device 102 of FIG. 1 may host a parallel reality game (or other location-based game) with a virtual world 410 that corresponds to the real world 400 as shown in FIG. 4.

As illustrated, the virtual world 410 can include a geography that parallels the geography of the real world 400. In particular, a range of coordinates defining a geographic area or space in the real world 400 is mapped to a corresponding range of coordinates defining a virtual space in the virtual world 410. The range of coordinates in the real world 400 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 410 corresponds to the player's position in the real world 400. For instance, the player A located at position 412 in the real world 400 has a corresponding position 422 in the virtual world 410. Similarly, the player B located at position 414 in the real world has a corresponding position 424 in the virtual world. As the players move about in a range of geographic coordinates in the real world 400, the players also move about in the range of coordinates defining the virtual space in the virtual world 410. In particular, a positioning system associated with the client device 102 carried by a player (e.g. a GPS system or other system used by the localization and mapping module 112) can be used to track the player's position as the player navigates the range of geographic coordinates in the real world. Data associated with the player's position in the real world 400 is used to update the player's position in the corresponding range of coordinates defining the virtual space in the virtual world 410. In this manner, players can navigate a continuous track in the range of coordinates defining the virtual space in the virtual world 410 by simply traveling among the corresponding range of geographic coordinates in the real world 400 without having to check in or periodically update location information at specific discrete locations in the real world 400.

The parallel reality game can include a plurality of game objectives requiring players to travel to and/or interact with various virtual elements and/or virtual objects scattered at various virtual locations in the virtual world 410. A player can travel to these virtual locations by traveling to the corresponding location of the virtual elements or objects in the real world 400. For instance, a positioning system of the client device 102 can continuously track the position of the player such that as the player continuously navigates the real world 400, the player also continuously navigates the parallel virtual world 410. The player can then interact with various virtual elements and/or objects at the specific location to achieve or perform one or more game objectives.

For example, referring to FIG. 4, a game objective can require players to capture or claim ownership of virtual elements 430 located at various virtual locations in the virtual world 410. These virtual elements 430 can be linked to landmarks, geographic locations, or objects 440 in the real world 400. The real-world landmarks or objects 440 can be works of art, monuments, buildings, businesses, libraries, museums, or other suitable real-world landmarks or objects. To capture these virtual elements 430, a player must travel to the landmark, geographic location, or object 440 linked to the virtual elements 430 in the real world and must perform any necessary interactions with the virtual elements 430 in the virtual world 410. For example, player A of FIG. 4 will have to travel to a landmark 440 in the real world 400 in order to interact with or capture, via the client device 102, a virtual element 430 linked with that particular landmark 440. The interaction with the virtual element 430 can require action in the real world 400, such as taking a photograph and/or verifying, obtaining, or capturing other information about the landmark or object 440 associated with the virtual element 430.

Game objectives can require that players use one or more virtual items that are collected by the players in the parallel reality game. For instance, the players may have to travel the virtual world 410 seeking virtual items (e.g. weapons or other items) that can be useful for completing game objectives. These virtual items can be found or collected by traveling to different locations in the real world 400 or by completing various actions in either the virtual world 410 or the real world 400. In the example shown in FIG. 4, a player uses virtual items 432 to capture one or more virtual elements 430. In particular, a player can deploy virtual items 432 at locations in the virtual world 410 proximate the virtual elements 430. Deploying one or more virtual items 432 proximate a virtual element 430 can result in the capture of the virtual element 430 for the particular player or for the team and/or faction of the particular player.

In one particular implementation, a player may have to gather virtual energy as part of the parallel reality game. As depicted in FIG. 4, virtual energy 450 can be scattered at different locations in the virtual world 410. A player can collect the virtual energy 450 by traveling to the corresponding location of the virtual energy 450 in the real world 400. The virtual energy 450 can be used to power virtual items and/or to perform various game objectives in the parallel reality game. A player that loses all virtual energy 450 can be disconnected from the parallel reality game.

According to aspects of the present disclosure, the parallel reality game can be a massive multi-player location-based game where every participant in the parallel reality game shares the same virtual world. The players can be divided into separate teams or factions and can work together to achieve one or more game objectives, such as to capture or claim ownership of a virtual element 430. In this manner, the parallel reality game can intrinsically be a social game that encourages cooperation among players within the parallel reality game. Players from opposing teams can work against each other during the parallel reality game. A player can use virtual items 432 to attack or impede progress of players on opposing teams.

The parallel reality game can have various features to enhance and encourage game play within the parallel reality game. For instance, players can accumulate a virtual currency or other virtual reward that can be used throughout the parallel reality game. Players can advance through various levels as the players complete one or more game objectives and gain experience within the parallel reality game. Players can communicate with one another through one or more communication interfaces provided in the parallel reality game. Players can also obtain enhanced "powers" or virtual items 432 that can be used to complete game objectives within the parallel reality game. Those of ordinary skill in the art, using the disclosures provided herein, should understand that various other game features can be included with the parallel reality game without deviating from the scope of the present disclosure.

EXAMPLE METHODS

Figure 5:
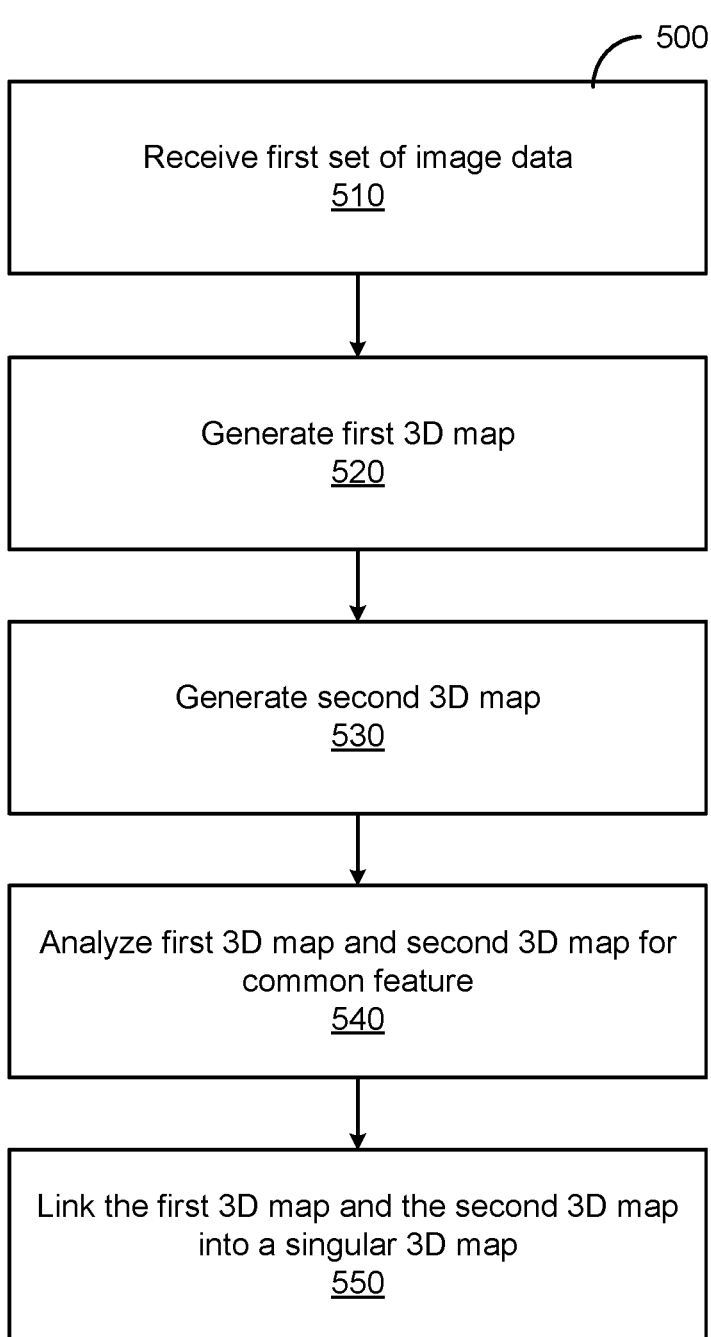
FIG. 5 is a flowchart illustrating linking together a first 3D map and a second 3D map into a singular 3D map of an environment, according to an embodiment.

FIG. 5 is a flowchart illustrating a process 500 for linking together a first 3D map and a second 3D map into a singular 3D map of an environment, according to an embodiment. In some embodiments, the process 500 may by altered to be performed client-side instead of server-side. In this embodiment, the server receives 510 a first set of image data captured by a camera of a first client device 102. The image data represents a near real-time view of a first area around the first client device 102 in an environment. The server generates 520 a first 3D map based on the first set of image data and, in some cases, location data captured by the first client device 102. The 3D map spatially describes the first area around the first client device 102.

The server receives a second set of image data captured from second client device 102 in the environment. The second set of image data describes a second area around the second client device 102, and the server generates 530 a second 3D map based on the second set of image data. The server analyzes 540 the first 3D map and the second 3D map for a common feature located in both 3D maps. Responsive to the server finding a common feature in the first 3D map and the second 3D map, the server links 550 the first 3D map and the second 3D map into a singular 3D map describing the environment. In another embodiment, the client devices 102 generate the first and second 3D maps and send them to the server, which determines whether and how to link them together.

In some embodiments, the first and second 3D maps may be associated in a graph of nodes. In particular, the first and second 3D map may each be represented by nodes linked by an edge in the graph. Each node is associated with a different coordinate space representing the client device 102 that captured the image data used to generate the 3D map or a time that the image data was captured by the respective client device. The edge includes a transformation between the different coordinate spaces of the linked nodes. The server may determine the edge based on the analysis 540, which may include one or more of session information, point feature-based localization, line feature-based localization, 3D cloud alignment, forced overlap, optimization, or QR code-based localization.

Figure 6:
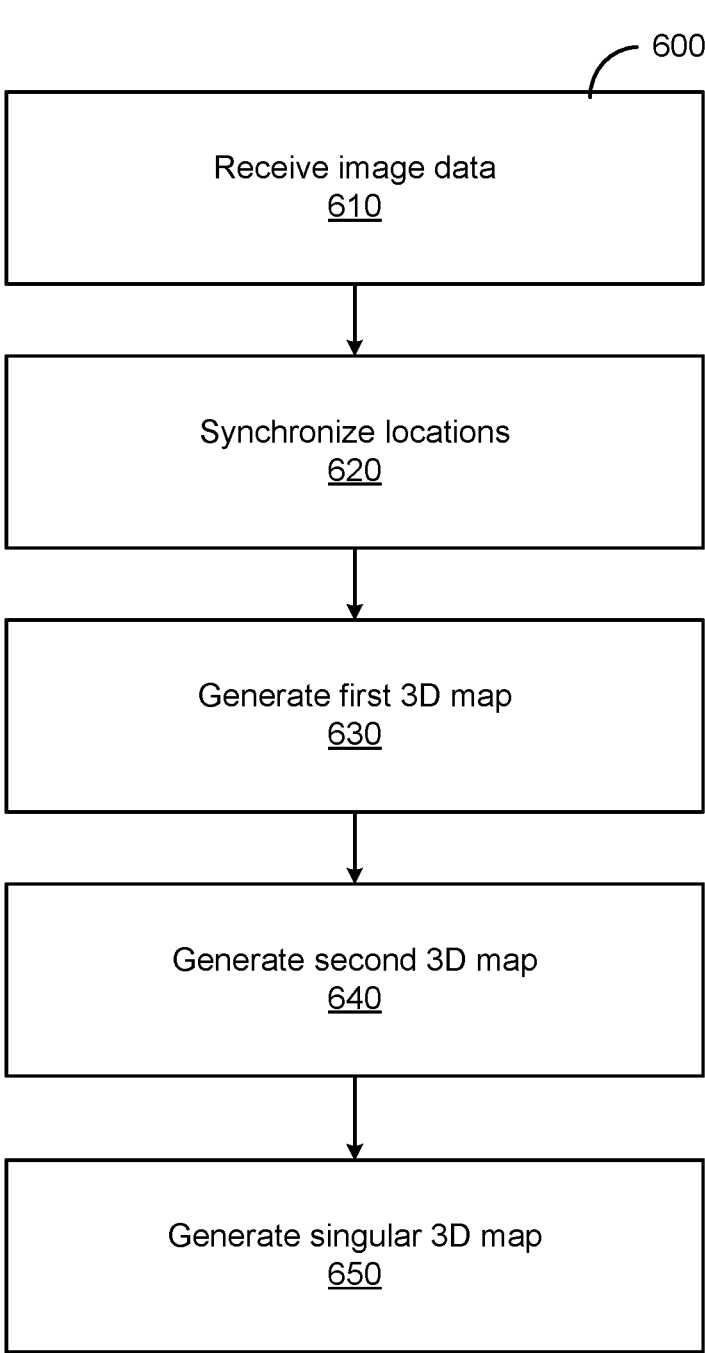
FIG. 6 is a flowchart illustrating generating a singular 3D map of an environment based on a synchronization, according to an embodiment.

FIG. 6 is a flowchart illustrating a process 600 for generating a singular 3D map of an environment based on a synchronization, according to an embodiment. In some embodiments, the process 600 may by altered to be performed client-side. In this embodiment, the server receives 610 image data captured by a camera of a first client device 102. The image data represents a near real-time view of a first area around the first client device in an environment. The server synchronizes 620 locations between the first client device 102 and a second client device 102. In some embodiments, the server synchronizes the locations by receiving image data from each client device 102 of a feature, such as a QR code or another client device.

The server generates 630 a first 3D map from the first client device based on the image data. Alternatively, the first 3D map may be generated by the client devices 102 and sent to the server rather than the image data. The first 3D map spatially describes the first area around the first client device 102. The first 3D map may be raw images or a point cloud generated by the first client device 102. The server receives image data captured from the second client device 102 in the environment. The image data describes a second area around the second client device 102, and the server generates 640 a second 3D map from the second client device based on the image data. The server generates 650 a singular 3D map from the first 3D map and the second 3D map based on the synchronization. Because the locations of the devices are synchronized within the environment, the relative locations of features within the first and second 3D maps may be determined, even if the maps do not overlap.

COMPUTING MACHINE ARCHITECTURE

Figure 7:
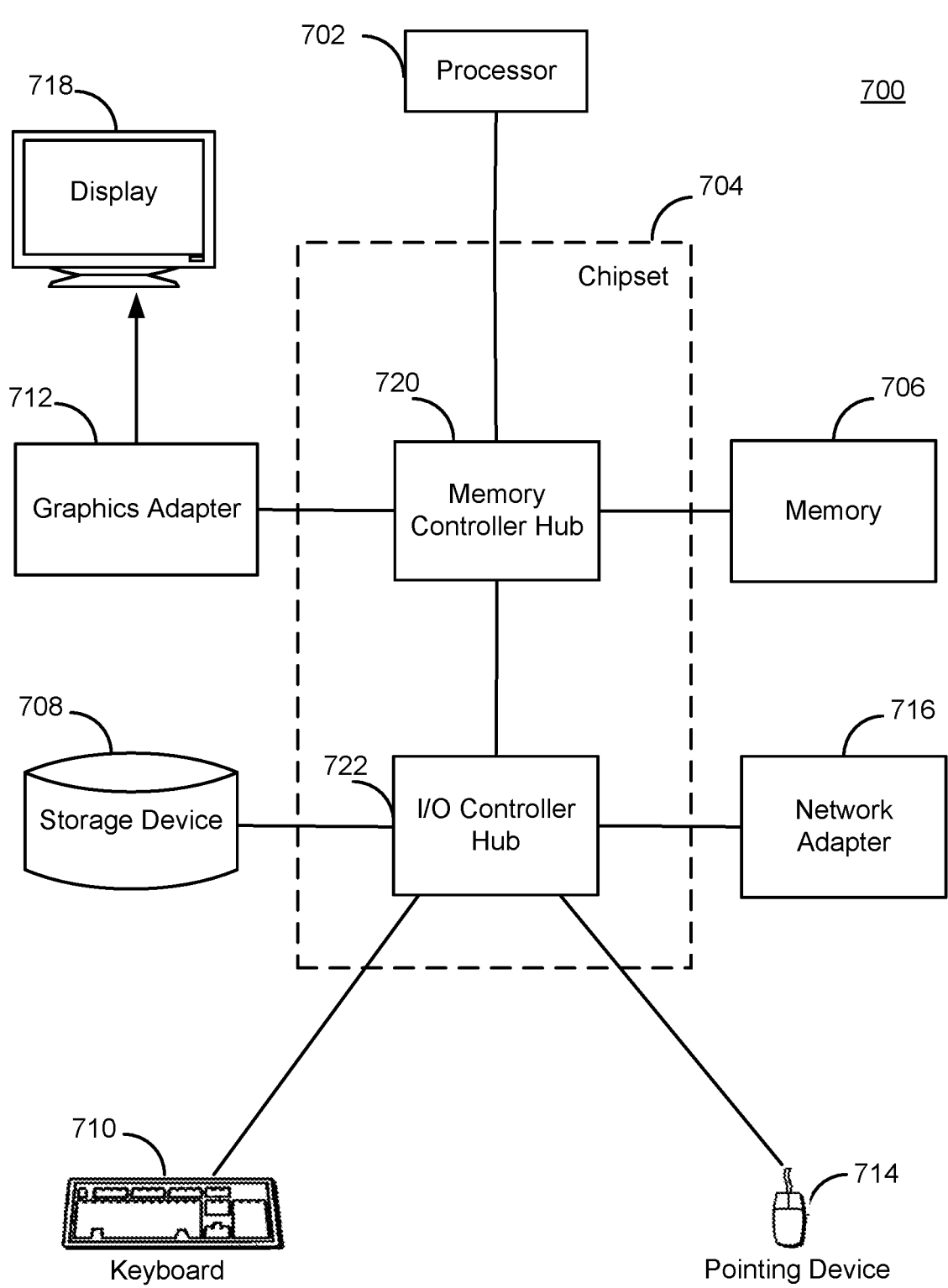
FIG. 7 is a high-level block diagram illustrating an example computer suitable for use as a client device or a server, according to an embodiment.

FIG. 7 is a high-level block diagram illustrating an example computer 700 suitable for use as a client device 102 or a server. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. In other embodiments, the computer 700 has various other input mechanisms such as touch screens, joysticks, buttons, scroll wheels, etc., or any combination thereof. The graphics adapter 712 displays images and other information on the display 718. The network adapter 716 couples the computer system 700 to one or more computer networks (e.g., the network adapter 716 may couple the client device 102 to the server via the network 104).

The types of computers used by the entities of FIG. 1 can vary depending upon the embodiment and the processing power required by the entity. For example, a server might include a distributed database system comprising multiple blade servers working together to provide the functionality described. Furthermore, the computers can lack some of the components described above, such as keyboards 710, graphics adapters 712, and displays 718.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

What is claimed is:

1. A computer-implemented method of combining map data to generate a three-dimensional (3D) map of an environment, the computer-implemented method comprising:

synchronizing locations between a first client device and a second client device based on a common feature in (a) a first set of image data generated by the first client device and (b) a second set of image data generated by the second client device, wherein synchronizing the locations between the first client device and the second client device based on the common feature is performed prior to generating a first 3D map based on the first set of image data and prior to generating a second 3D map based on the second set of image data;

responsive to synchronizing the locations between the first client device and the second client device based on the common feature, generating the first 3D map based on the first set of image data generated by the first client device;

responsive to synchronizing the locations between the first client device and the second client device based on the common feature, generating the second 3D map based on the second set of image data generated by the second client device; and generating a singular 3D map from the first and second 3D maps based on the synchronized locations between the first client device and the second client device.

2. The computer-implemented method of claim 1, wherein generating the singular 3D map comprises stitching together the first and second 3D maps based on the synchronized locations between the first client device and the second client device.

3. The computer-implemented method of claim 1, wherein generating the singular 3D map is further based on the common feature in the first and second sets of image data.

4. The computer-implemented method of claim 3, wherein the common feature is a QR code or a third client device.

5. The computer-implemented method of claim 1, further comprising:

before generating the singular 3D map from the first and second 3D maps, identifying a first feature in the first 3D map;

identifying a second feature in the second 3D map different than the first feature; and determining a location of the first feature relative to the second feature based on the synchronized locations between the first client device and the second client device.

6. The computer-implemented method of claim 5, wherein generating the singular 3D map is further based on the location of the first feature relative to the second feature.

7. The computer-implemented method of claim 5, wherein the first feature is a common feature in the first and second 3D maps.

8. The computer-implemented method of claim 1, wherein the first and second 3D maps do not overlap.

9. The computer-implemented method of claim 1, wherein:

the first 3D map is associated with a first node of a graph;

the second 3D map is associated with a second node of the graph; and the first node and the second node are linked by an edge determined based on the synchronized locations between the first client device and the second client device.

10. The computer-implemented method of claim 1, further comprising:

before generating the singular 3D map from the first and second 3D maps, receiving the first set of image data and the second set of image data;

generating the first 3D map based on the first set of image data; and generating the second 3D map based on the second set of image data.

11. A non-transitory computer-readable storage medium storing instructions that, when executed by a computing device, cause the computing device to perform operations including:

synchronizing locations between a first client device and a second client device based on a common feature in (a) a first set of image data generated by the first client device and (b) a second set of image data generated by the second client device, wherein synchronizing the locations between the first client device and the second client device based on the common feature is performed prior to generating a first 3D map based on the first set of image data and prior to generating a second 3D map based on the second set of image data;

responsive to synchronizing the locations between the first client device and the second client device based on the common feature, generating the a first 3D map based on the first set of image data generated by the first client device;

responsive to synchronizing the locations between the first client device and the second client device based on the common feature, generating the second 3D map based on the second set of image data generated by the second client device; and generating a singular 3D map from the first and second 3D maps based on the synchronized locations between the first client device and the second client device.

12. The non-transitory computer-readable storage medium of claim 11, wherein generating the singular 3D map comprises stitching together the first and second 3D maps based on the synchronized locations between the first client device and the second client device.

13. The non-transitory computer-readable storage medium of claim 11, wherein generating the singular 3D map is further based on the common feature in the first and second sets of image data.

14. The non-transitory computer-readable storage medium of claim 13, wherein the common feature is a QR code or a third client device.

15. The non-transitory computer-readable storage medium of claim 11, wherein the operations further comprise:

before generating the singular 3D map from the first and second 3D maps, identifying a first feature in the first 3D map;

identifying a second feature in the second 3D map; and determining a location of the first feature relative to the second feature based on the synchronized locations between the first client device and the second client device.

16. The non-transitory computer-readable storage medium of claim 15, wherein generating the singular 3D map is further based on the location of the first feature relative to the second feature.

17. The non-transitory computer-readable storage medium of claim 15, wherein the first feature is a common feature in the first and second 3D maps.

18. The non-transitory computer-readable storage medium of claim 11, wherein the first and second 3D maps do not overlap.

19. The non-transitory computer-readable storage medium of claim 11, wherein:

the first 3D map is associated with a first node of a graph;

the second 3D map is associated with a second node of the graph; and the first node and the second node are linked by an edge determined based on the synchronized locations between the first client device and the second client device.

20. A computer system comprising:

a computer processor system; and a computer-readable storage medium storing instructions that when executed by the computer processor system perform operations comprising:

synchronizing locations between a first client device and a second client device based on a common feature in (a) a first set of image data generated by the first client device and (b) a second set of image data generated by the second client device, wherein synchronizing the locations between the first client device and the second client device based on the common feature is performed prior to generating a first 3D map based on the first set of image data and prior to generating a second 3D map based on the second set of image data;

responsive to synchronizing the locations between the first client device and the second client device based on the common feature, generating the first 3D map based on the first set of image data generated by the first client device;

responsive to synchronizing the locations between the first client device and the second client device based on the common feature, generating the second 3D map based on the second set of image data generated by the second client device; and generating a singular 3D map from the first and second 3D maps based on the synchronized locations between the first client device and the second client device.

* * * * *